Oct. 21, 1952 E. SOKOLIK Re. 23,567
FISHING BOBBER
Original Filed Aug. 22, 1946
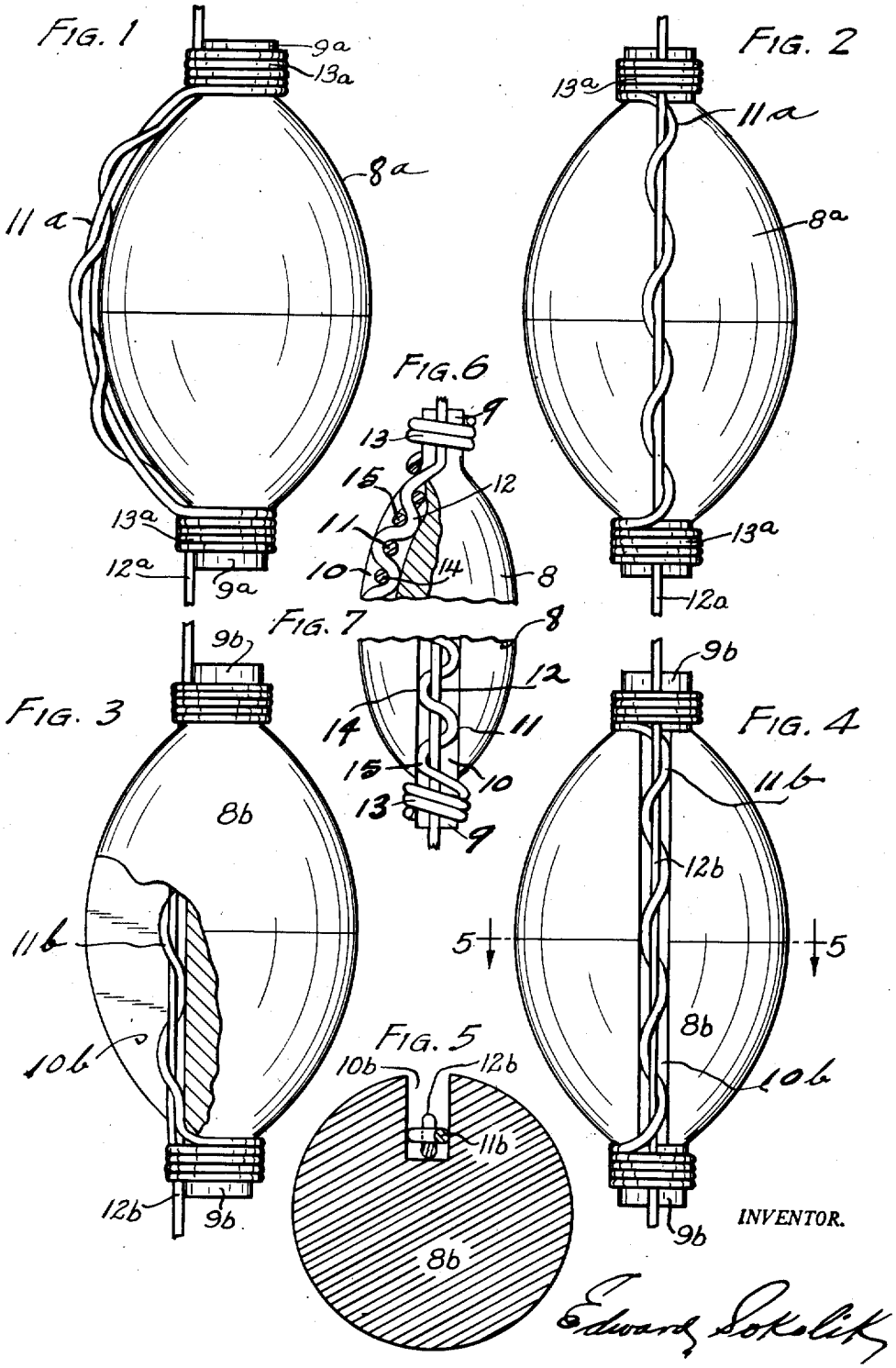
INVENTOR.
Edward Sokolik Reissued Oct. 21, 1952

Re. 23,567

UNITED STATES PATENT OFFICE 23,567

FISHING BOBBER

Edward Sokolik, New Brighton, Minn.

Original No. 2,578,852, dated December 18, 1951, Serial No. 692,247, August 22, 1946. Application for reissue January 11, 1952, Serial No. 266,017

6 Claims. (Cl. 43—44.94)

Matter enclosed in heavy brackets [ ] appears in the original patent but forms no part of this reissue specification; matter printed in italics indicates the additions made by reissue.

My invention relates to improvements in a fishing bobber. In general the invention relates to a fishing bobber which may be detachably connected to a fishing line, and incorporates means for detachably connecting the bobber to the line without having to thread the line through the bobber or secure the bobber to the line by means of knots in the line, either practice tending to cause decomposition of the fish line.

The present invention includes a buoyant body [of a generally elliptical shape and formed with axial ends] *having an enlarged central portion provided with end portions transversely reduced in extent.* A spring wire is carried by the buoyant body [and the wire is coiled at its opposite ends so as to encompass the ends of the body] *preferably along the surface of the enlarged central portion.* An intermediate portion of the wire between the coiled ends is formed [into a plurality of zigzag crimps] *in a series of flat spaced crimp-like loops* which follow the contour of the adjacent body portion and form a means of frictionally engaging the line when the latter is woven through adjacent [crimps] *loops.* The bobber may be formed as a solid body in which case the [crimped intermediate portion extends] *crimp-like loops extend* in a longitudinal arc on the outer surface between the opposite *reduced* ends of the body, or alternatively the bobber may have a longitudinal groove formed in its outer surface which extends between the opposite [axial stub ends] *reduced end portions* and in the latter case the intermediate [crimped portion] *crimp-like loops* of the wire will lie within the groove so as to extend in a substantially flat plane between the coiled ends of the wire. *The wire is coiled at its opposite ends so as to encompass the reduced ends of the body in a series of coils. Said reduced ends may be of any desired type, specifically, as shown, in the form of cylindrical or stub-like projections.* The coiled ends of the wire in addition to securing the wire onto the ends of the bobber also form a helical guide for receiving portions of the fish line at either end of the bobber. The [crimped portion] *crimp-like loops* in addition to forming a sliding friction with the fish line, form a tension between the opposite coiled ends to securely hold the wire on the bobber.

The advantage of this arrangement resides in the fact that the bobber can be attached to the fish line without having to remove the fishing hook from the end of the line, and without having to remove the line from the fishing pole, it being only necessary to engage the line in the coiled end portions of the wire and then weave the intermediate portion of the line within the [crimped portion] *crimp-like loops* of the wire.

An object of the invention is to provide in combination with a fishing bobber, means for securing the bobber to a fish line, including a first portion which grips the line at opposite ends of the bobber and a second portion which creates a tension between the coiled ends and frictionally grips the line intermediate the opposite ends of the bobber.

Another object is to provide in combination with a bobber of generally elliptical shape, a spring wire having coils at the opposite ends thereof that engage the axial ends of the bobber, and containing [a crimped portion] *crimp-like loops* intermediate the ends which frictionally engage the fishing line to hold the line in contact with the bobber, but detachably removable therefrom.

A further object is to provide in combination with a fishing bobber having [axial stub ends] *transversely reduced end portions,* means for detachably connecting a fish line to the bobber, consisting of a spring wire which is coiled at its opposite ends to encircle the [stub ends] *reduced end portions* of the bobber and helically receive portions of the fish line, together with a crimped intermediate portion that frictionally engages the fish line between the opposite ends of the bobber.

Other and further objects may be found in the following specification and claims, and in the appended drawing in which:

Figs. 1 and 2 are side elevations of one embodiment of the invention;

Figs. 3 and 4 are side elevations of another form of the invention;

Fig. 5 is a section on line 5—5, Fig. 4.

Figs. 6 and 7 are one-half portions of the same bobber. Fig. 6 is a side elevation with a fragmentary section showing how the fishing line weaves through the alternating spring wire loops. Fig. 7 is a side elevation at quarter turn of the other half-portion of the bobber.

Figs. 6 and 7 represent the preferred embodiment of the invention. The numeral 8 indicates the *enlarged central portion* buoyant element of the bobber. The element is preferably [of an elliptic form] *formed* with [preferably stubbed] *an enlarged central portion with transversely reduced* end portions 9, *as shown, being specifically in the form of cylindrical or stub-like projections.* If it is made of permeative material, such as wood, it should be waterproofed, as by painting—preferably aluminum or white on one-half thereof, and red on the other one-half. If it is of cork, plastic or other non-permeative material, waterproofing is not essential.

As illustrated, countersunk in the surface from end to end, in the bobber 8 [is] *may be* a superficial groove 10, which through the [stub] *reduced* end portions 9, is narrower and deeper.

The object of this groove 10, is to accommodate and harbor the spring 11, carrying the fishing line 12, streamlining the device, and permitting the line 12, to emerge from the axis thereof. This spring 11 may be luminously adapted for evening fishing.

The spring 11 comprises the coiled end-portion 13, the wire ends of which may be curved downwardly on the exterior thereof, to prevent the fishing line 12, from rubbing on the wire ends and possibly detaching itself. If these wire ends were extended, they could be projected into a hole in the end of the bobber and so obviate the use of the stub end-portions 9. Intermediate the coiled end-portions 13, of the spring 11, is a portion 14, which consists of a plurality of zigzag crimps *or crimp-like loops* 15, disposed in the groove 10.

Woven between the loops 15 by sliding thereinto from alternate sides, is the fishing line 12, which is helically also slipped into the coiled end-portions 13. The sliding friction on the line is controlled by the number of predetermined weaves through the crimps. The wire spring 11 is preferably stretchably, detachably mounted onto the [axial stub ends] *reduced end portions* 9.

Another advantage of this bobber 8, is the facility afforded for sliding or adjusting of the bobber 8, on the line 12. The bobber 8, or rather the spring 11, will not automatically slip on the line 12, unless moved by hand, and unlike the conventional bobber, will not damage the line 12, in sliding. The advantage of quick, external application of the bobber 8, to the line 12, must be appreciated.

Figs. 1 and 2 represent one modification of the invention and the reference numerals used in Figs. 6 and 7, with a affixed designate like parts. In this modification the spring 11–a, is disposed on the surface of the element 8–a. The rest is the same as Figs. 6 and 7.

Figs. 3, 4 and 5 represent another modification of the invention and the reference numerals used in Figs. 6 and 7 with b affixed designate like parts. In this modification the groove 10–b is narrow and deep, having the spring 11–b disposed therein with the loops 15–b axially disposed therein. The line 12–b, passes substantially straight therethrough. The rest is the same as Figs. 6 and 7.

What I claim is:

1. In a fishing bobber embodying an elongated float having axial stub ends, in combination with said float, of a spring wire of linear dimensions substantially greater than the distance between the opposite stud ends of the float, the intermediate portion of said wire between the stub ends of the float formed in a plurality of zigzag crimps extending in opposite lateral directions and following the contour of the adjacent portion of the bobber to receive and hold a fish line interwoven between adjacent crimps, each end of said wire formed into relatively tight resilient coils forming helical guides for the fish line on either side of the crimped portion of the wire, said coils also affording means for resiliently mounting the wire on the opposite stub ends of the float and holding the float on the fish line.

2. In a fishing bobber embodying an elongated float body having axial stub ends, in combination with said float, of a spring wire of a length substantially greater than the distance between the stub ends of the float, the intermediate portion of said wire formed in a multiplicity of zigzag crimps extending in opposite lateral directions and following the contour of the adjacent portion of the bobber to receive and hold a fish line interwoven between adjacent crimps, the predetermined number of such crimps controlling the sliding friction of the wire upon the fish line, and also controlling the tension between the opposite ends of the wire, each end of said wire formed into resilient coils forming helical guides for the fish line on either end of the intermediate portion, and also affording means for mounting the wire on the opposite stub ends of the float by circumscribing said stub ends.

3. In a fishing bobber embodying an elongated float body having axial stub ends, said body having a recess formed in its outer surface and extending axially between the stub ends, in combination with said float, of a spring wire of a length substantially greater than the distance between the stub ends of the float, the intermediate portion of said wire formed in a multiplicity of zigzag crimps extending in opposite lateral directions and following the contour of the adjacent portion of the bobber to receive and hold a fish line interwoven between adjacent crimps, the predetermined number of such crimps controlling the sliding friction of the wire upon the fish line, and also controlling the tension between the opposite ends of the wire, each end of said wire formed into resilient coils forming helical guides for the fish line on either end of the intermediate portion, and also affording means for mounting the wire on the opposite stub ends of the float, the crimped intermediate portion of said wire normally lying within the recess in the outer surface of said float.

*4. In a fishing bobber embodying an elongated float having an enlarged central portion and reduced end portions, in combination with said float, of a spring wire of a length substantially greater than the distance between the stub ends of the float, the intermediate portion of said wire being formed in a multiplicity of zigzag crimps extending in opposite lateral directions and following the contour of the adjacent portion of the bobber to receive and hold a fish line interwoven between adjacent crimps, the predetermined number of such crimps controlling the sliding friction of the wire upon the fish line, and also controlling the tension between the opposite ends of the wire, each end of said wire being formed into resilient coils forming helical guides for the fish line on either end of the intermediate portion, and also affording means for mounting the wire on the opposite reduced end portions of the float by circumscribing said reduced portions.*

*5. In a fishing bobber embodying an elongated float body having an enlarged central portion and transversely reduced end portions, said body having a recess formed in its outer surface and extending axially between the reduced ends, in combination with said float, of a spring wire of a length substantially greater than the distance between the reduced ends of the float, the intermediate portion of said wire being formed in a multiplicity of zigzag crimps extending in opposite lateral directions and following the contour of the adjacent portion of the bobber to receive and hold a fish line interwoven between adjacent crimps, the predetermined number of such crimps controlling the sliding friction of the wire*

*upon the fish line, and also controlling the tension between the opposite ends of the wire, each end of said wire being formed into resilient coils forming helical guides for the fish line on either end of the intermediate portion, and also affording means for mounting the wire on the opposite reduced ends of the float, the crimped intermediate portion of said wire normally lying within the recess in the outer surface of said float.*

*6. In a fishing bobber embodying an elongated float having an enlarged central portion and transversely reduced end portions, in combination with said float, of a spring wire of linear dimensions substantially greater than the distance between the opposite reduced ends of the float, the intermediate portion of said wire between the reduced ends of the float being formed in a plurality of zigzag crimps extending in opposite lateral directions and following the contour of the adjacent portion of the bobber to receive and hold a fish line interwoven between adjacent crimps, each end of said wire being formed into relatively tight resilient coils forming helical guides for the fish line on either side of the crimped portion of the wire, said coils also affording means for resiliently mounting the wire on*

*the reduced end portions of the float and holding the float on the fish line.*

EDWARD SOKOLIK.

REFERENCES CITED

The following references are of record in the file of this patent or the original patent:

UNITED STATES PATENTS

| Number | Name | Date |
|---|---|---|
| 128,885 | Jewell | July 9, 1872 |
| 231,417 | Foote | Aug. 24, 1880 |
| 341,954 | Skinner | May 18, 1886 |
| 615,078 | Lubbock | Nov. 29, 1898 |
| 738,923 | Lewis | Sept. 15, 1903 |
| 790,336 | Yoeger | May 23, 1905 |
| 798,620 | Persing | Sept. 5, 1905 |
| 943,450 | Owens | Dec. 14, 1909 |
| 1,157,517 | Easlick | Oct. 19, 1915 |
| 1,383,174 | Udy | June 28, 1921 |
| 1,725,610 | Byl | Aug. 20, 1929 |
| 1,883,574 | Cleeland | Oct. 18, 1932 |
| 2,135,847 | Rosenquist | Nov. 8, 1938 |
| 2,188,399 | Bieber | Jan. 30, 1940 |
| 2,289,710 | Kelso | July 14, 1942 |